(12) United States Patent
Mäenpää et al.

(10) Patent No.: US 9,473,409 B2
(45) Date of Patent: Oct. 18, 2016

(54) LOAD BALANCING MECHANISM FOR SERVICE DISCOVERY MECHANISM IN STRUCTURED PEER-TO-PEER OVERLAY NETWORKS AND METHOD

(75) Inventors: Jouni Mäenpää, Nummela (FI); Jani Hautakorpi, Masala (FI); Jaime Jiménez, Espoo (FI)

(73) Assignee: TELEFONAKETIEBOLAGET L M ERICSSON, Stockholm (SE)

( * ) Notice: Subject to any disclaimer, the term of this patent is extended or adjusted under 35 U.S.C. 154(b) by 283 days.

(21) Appl. No.: 14/004,545

(22) PCT Filed: Apr. 13, 2011

(86) PCT No.: PCT/IB2011/000826
§ 371 (c)(1),
(2), (4) Date: Oct. 2, 2013

(87) PCT Pub. No.: WO2012/140459
PCT Pub. Date: Oct. 18, 2012

(65) Prior Publication Data
US 2014/0016471 A1    Jan. 16, 2014

(51) Int. Cl.
*H04L 12/26* (2006.01)
*H04L 12/803* (2013.01)
*H04L 29/08* (2006.01)

(52) U.S. Cl.
CPC ........... *H04L 47/125* (2013.01); *H04L 67/104* (2013.01); *H04L 67/1046* (2013.01); *H04L 67/1048* (2013.01); *H04L 67/1002* (2013.01); *H04L 67/16* (2013.01)

(58) Field of Classification Search
CPC .................................................. H04L 67/104

USPC .......................................................... 370/235
See application file for complete search history.

(56) References Cited

U.S. PATENT DOCUMENTS

| | | | |
|---|---|---|---|
| 2009/0083390 A1* | 3/2009 | Abu-Ghazaleh | ........ G06F 15/16 709/209 |
| 2010/0064008 A1* | 3/2010 | Yan | ........................ H04L 45/64 709/204 |

(Continued)

FOREIGN PATENT DOCUMENTS

EP    2 031 816 A1    3/2009

OTHER PUBLICATIONS

International Preliminary Report on Patentability in corresponding International Application No. PCT/IB2011/000826 mailed Oct. 24, 2013.

(Continued)

*Primary Examiner* — Mark Rinehart
*Assistant Examiner* — Matthew Hopkins
(74) *Attorney, Agent, or Firm* — Patents on Demand, P.A.; Brian K. Buchheit; Scott M. Garrett

(57) ABSTRACT

An overlay network, node and application for load balanced service discovery. The application includes the steps of implementing the service discovery mechanism in the DHT P2P overlay network for finding a peer (1100) that provides a desired service; a step of adding to a record structure (50) of the service discovery mechanism a maximum capacity parameter $C_{max}$ (54) and a currently used capacity parameter $C_{current}$ (56); and a step of removing from the tree (10) a record of the peer (1110) that provides the desired service when the currently used capacity reaches a predetermined capacity so that the peer is not contacted by other service clients.

17 Claims, 10 Drawing Sheets

(56) References Cited

U.S. PATENT DOCUMENTS

2010/0250589 A1  9/2010  Tsai
2012/0198051 A1*  8/2012  Maenpaa .......... H04L 29/12113
                                                                709/224

OTHER PUBLICATIONS

Silvia Bianchi Et al., "Adaptive Load Balancing for DHT Lookups", Computer Communications and Networks, Proceedings—15th International Conference on, IEEE, PI, Oct. 1, 2006 pp. 411-418, XP031011740.

K. Gummadi et al., "The Impact of DHT Routing Geometry on Resilience and Proximity", Computer Communication Review, ACM, New York, NY, US, vol. 33, No. 4, Oct. 1, 2003, pp. 381-394, XP001224095.

J. Maenpaa et al., "Service Discovery Usage for Resource Location and Discovery (RELOAD) Draft-IETF-P2PSIP-Service-Discovery-02.TXT", Internet Engineering Task Force, IETF; Standard Working Draft, Internet Society, Geneva Switzerland, No. 2, Jan. 7, 2011, pp. 1-14, XP015073390.

J. Maenpaa et al., "Service Discovery Usage for Resource Location and Discovery (RELOAD) Draft-IETF-P2PSIP-Service-Discovery-01.TXT", Internet Engineering Task Force, IETF; Standard Working Draft, Internet Society, Geneva Switzerland, No. 2, Jul. 12, 2010, pp. 1-13.

E. Harjula et al., "Load Balancing Models for DHT-based Peer-to-Peer Networks; Draft-harjula-p2psip-loadbalancing-survey-01.txt", Standard Working Draft, Internet Society, Geneva Switzerland, Mar. 8, 2010, pp. 1-12, XP015067825.

C. Jennings et al., "Resource Location and Discovery (RELOAD) Base Protocol draft-ietf-p2psip-base-11", Internet-Draft, Intended Status: Standard Track, Oct. 12, 2010, pp. 1-137.

Sean Rhea et al., "OpenDHT: A Public DHT Service and its Uses", SIGCOMM Aug. 21-26, 2005 Philadelphia Pennsylvania US.

International Search Report and Written Opinion mailed on Sep. 20, 2011 in corresponding PCT Application No. PCT/IB2011/000826.

\* cited by examiner

LOAD BALANCING MECHANISM FOR SERVICE DISCOVERY MECHANISM IN STRUCTURED PEER-TO-PEER OVERLAY NETWORKS AND METHOD

TECHNICAL FIELD

The present invention generally relates to systems, software and methods and, more particularly, to mechanisms and techniques for providing a load balancing mechanism for service discovery in an overlay network.

BACKGROUND

During the past years, various business models envision the use of large-scale distributed systems. These systems are hard to deploy and have their own challenges. One such example is distributed hash tables (DHTs). To lower the barriers facing DHT-based applications, a public DHT service called OpenDHT has been created (see for example, Rhea et al., OpenDHT: A Public DHT Service and Its Uses, Proceedings of the ACM SIGCOMM Conference on Computer Communications, 2005, the entire content of which is incorporated herein by reference).

REsource LOcation And Discovery (RELOAD) is a Peer-to-Peer (P2P) signaling protocol that can be used to maintain the overlay network and to store data in and retrieve data from the overlay. In a P2P overlay network such as a RELOAD Overlay Instance, the peers forming the overlay share their resources in order to provide the service the system has been designed to provide. The peers in the overlay both provide services to other peers and request services from other peers. Examples of possible services offered by peers in a RELOAD Overlay Instance include a TURN relay service, a voice mail service, a gateway location service, and a transcoding service. Typically, only a small subset of the peers participating in the system are providers (service providers) of a given service. A peer that wishes to use a particular service (service client) faces the problem of finding peers that are providing that service from the Overlay Instance.

Although RELOAD defines a Traversal Using Relays around Network Address Translation (TURN) specific service discovery mechanism, it does not define a generic service discovery mechanism as part of the base protocol. A Recursive Distributed Rendezvous (ReDiR) service discovery mechanism used in the OpenDHT discussed above can be applied to RELOAD overlays.

ReDiR is a service discovery mechanism for structured P2P overlay networks. As noted above, ReDiR has been adopted as a service discovery mechanism for the RELOAD protocol that is being specified in the Peer-to-Peer Session Initiation Protocol (P2PSIP) working group of the Internet Engineering Task Force (IETF). The RELOAD protocol and thus also ReDiR are used to enable the P2PSIP distributed interpersonal communication service.

ReDiR implements service discovery by building a tree structure of the peers that provide a particular service. ReDiR trees are service-specific, i.e., each service has its own ReDiR tree. The tree structure is embedded tree node by tree node into a DHT based P2P overlay network using the regular "Put" and "Get" requests provided by the DHT. The purpose of a Put request is to store a data record into the P2P overlay network, whereas the purpose of a Get request is to fetch a data record from the network.

Each tree node in the ReDiR tree contains pointers to peers providing a particular service. The ReDiR tree 10 is illustrated in FIG. 1. The tree 10 has multiple levels 12 to 18. Each tree node belongs to a particular level. For example, tree nodes 24a-d belong to level 16. The root 12 of the tree 10 contains a single node 20 at level 0. The immediate children of the root are at level 1, and so forth. The ReDiR tree has a branching factor b, which is 2 in the example shown in FIG. 1. At every level "i" in the tree, there are at most $b^i$ nodes. The nodes at any level are labeled from left to right, such that a pair (i, j) uniquely identifies the jth node (counted from the left) at level i. The tree is embedded into the DHT node by node, by storing the values of node (i, j) at key H(namespace, i, j), where H is a hash function such as Secure Hash Algorithm One (SHA-1), and namespace is a string that identifies the service being provided. As an example, the namespace of a TURN relay service could be for instance the string "turn-service".

Each level in the ReDiR tree spans the whole identifier space 28 of the DHT. At each level, the ID space is divided among the tree nodes. Each tree node is further divided into b intervals. In FIG. 1, each tree node has two intervals because b=2. As an example, because level 2 in the figure has 4 tree nodes, each of which has two intervals, the whole identifier space of the DHT is at that level divided into 8 parts (i.e., intervals). When storing a record with identifier X in a given level, the record is stored in the interval within whose range X falls.

The act of storing a record in the ReDiR tree is referred to as ReDiR service registration procedure. The act of fetching a record from the ReDiR tree is referred to as ReDiR service discovery operation. It is noted that the ReDiR and RELOAD protocols are known in the art and they are standardized and it is not obvious for one skilled in the art to modify these protocols.

Various simulations run for the ReDiR protocol have identified a number of areas where ReDiR performs poorly. One finding is that ReDiR does not distribute the service clients equally among the service providers. Another issue is that ReDiR does not take into account the heterogeneity of service providers as ReDiR assumes that all the service providers have equal capacity.

Accordingly, it would be desirable to provide devices, systems and methods that avoid the afore-described problems and drawbacks.

SUMMARY

Recursive Distributed Rendezvous (ReDiR) is a service discovery mechanism for structured Peer-to-Peer (P2P) overlay networks. ReDiR has been adopted as a service discovery mechanism for the REsource LOcation And Discovery (RELOAD) protocol that is being specified in the Peer-to-Peer Session Initiation Protocol (P2PSIP) working group. The RELOAD protocol and thus also ReDiR are used to enable the P2PSIP distributed interpersonal communication service. However, the existing service discovery mechanism does not distribute the service clients equally among the service providers and does not take into account the heterogeneity of the service providers.

According to an exemplary embodiment, there is an application for load balancing a service discovery mechanism in a Distributed Hash Table, DHT, based Peer-to-Peer, P2P, overlay network, the overlay network including plural peers and those peers that provide services are service providers and other peers that use the services are service clients. The application includes the steps of: implementing the service discovery mechanism in the DHT P2P overlay network for finding a peer that provides a desired service, wherein the service discovery uses a tree for the desired service; adding to a record structure of the service discovery mechanism a maximum capacity parameter $C_{max}$ and a currently used capacity parameter $C_{current}$, wherein the maximum capacity and the currently used capacity parameters are associated with the peer that provides the desired service; and removing from the tree a record of the peer that provides the desired service when the currently used capacity reaches a predetermined capacity so that the peer is not contacted by other service clients.

According to another exemplary embodiment, there is a service discovery mechanism in a Distributed Hash Table, DHT, based Peer-to-Peer, P2P, overlay network, the overlay network including plural peers and part of the plural peers that provide services are service providers and part of the plural peers that use the services are service clients. The overlay network includes: a server configured to run the service discovery mechanism in the DHT P2P overlay network for finding a peer that provides a desired service; a record structure of the service discovery mechanism that includes a maximum capacity parameter $C_{max}$ and a currently used capacity parameter $C_{current}$; and the service discovery mechanism is configured to remove from the tree a record of the peer that provides the desired service when the currently used capacity reaches a predetermined capacity so that the peer is not contacted by other service clients.

According to still another exemplary embodiment, there is a peer that uses a service discovery mechanism or a service registration mechanism in a Distributed Hash Table, DHT, based Peer-to-Peer, P2P, overlay network, the overlay network including plural peers. The peer includes: an interface configured to communicate with the overlay network for using the service discovery mechanism in the DHT P2P overlay network for finding another peer that provides a desired service or the service registration mechanism for registering with a tree for providing the desired service in the DHT P2P overlay network; and a processor configured to add to a record structure of the service discovery mechanism or the service registration mechanism a maximum capacity parameter $C_{max}$ and a currently used capacity parameter $C_{current}$.

It is an object to overcome some of the deficiencies discussed in the previous section and to provide a service discovery mechanism that better distributes a load among the service providers and takes into account the heterogeneity of the service providers. One or more of the independent claims advantageously provides such an adaptive service discovery mechanism.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of ReDiR in the context of Peer-to-Peer Session Initiation Protocol. However, the embodiments to be discussed next are not limited to this protocol but may be applied to other existing P2P based protocols.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, the novel features to be discussed next address one or more shortcomings of the ReDiR service discovery mechanism that has been adopted as a service discovery mechanism for RELOAD by the P2PSIP working group of the IETF. One or more shortcomings of the existing discovery mechanism, e.g., the poor distribution of load among service providers, is corrected by including information about the maximum capacity and currently used capacity of the service providers in the ReDiR tree. New mechanisms are added to ReDiR to modify the behaviour of the ReDiR service providers and/or service clients to take advantage of the newly added capacity information.

Figure 1:
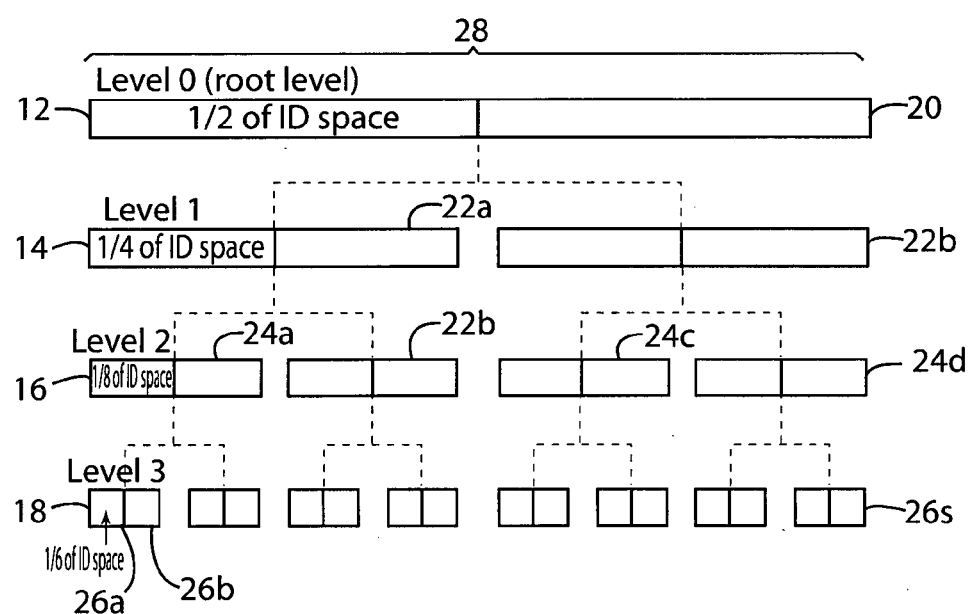
FIG. 1 is a schematic diagram of a tree for a given service.
Figure 2:
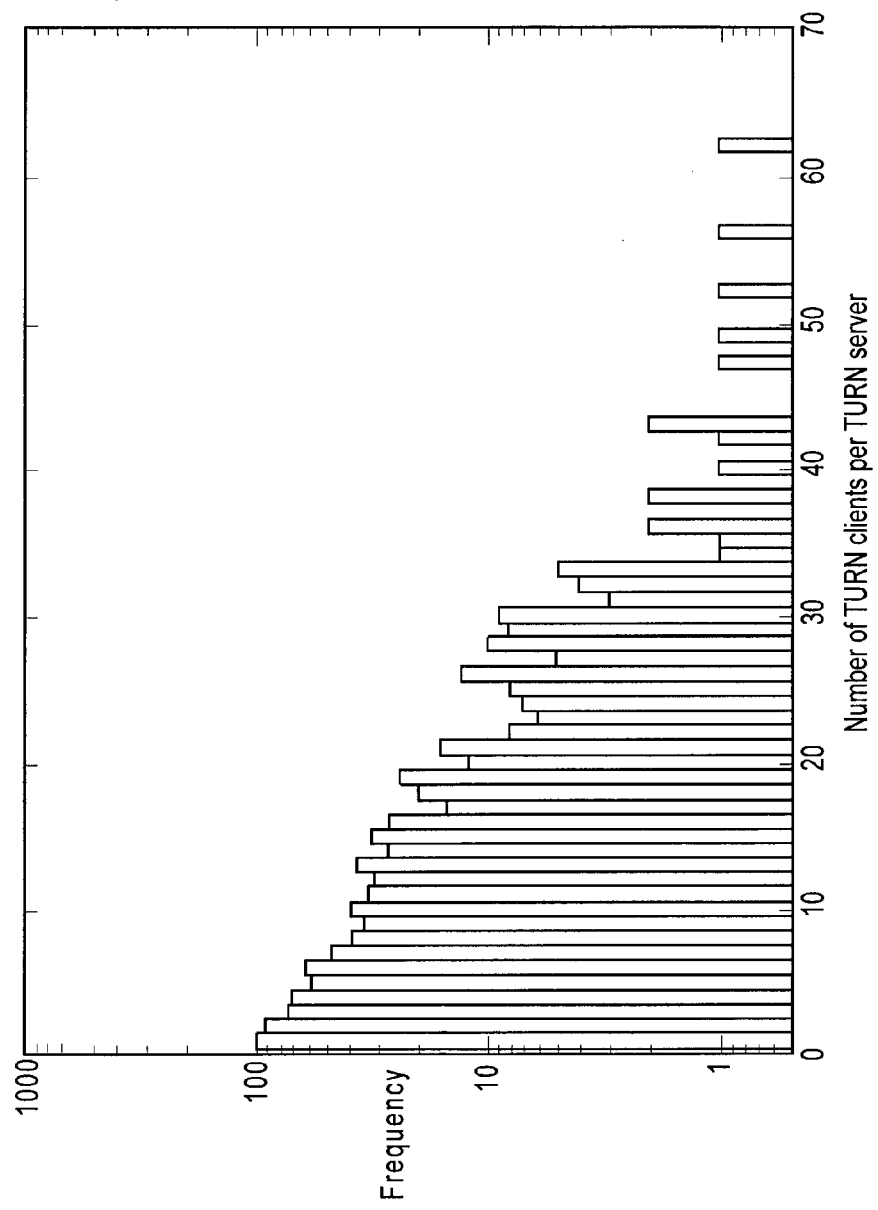
FIG. 2 illustrates a distribution of service clients per service provider for a traditional discovery mechanism.

In order to fully appreciate the novel features, the limitations of the traditional, default, ReDiR mechanism are briefly discussed next. The unmodified ReDiR mechanism does not distribute the service clients equally among the service providers as shown in FIG. 2. The histogram shown in FIG. 2 simulates the number (i.e., frequency) of service clients per service provider in a P2PSIP network having 1000 service providers and 9000 service clients. It can be seen that ReDiR does a poor job at balancing the load as there are, on one hand, a high number of service providers having 0 or 1 service clients (e.g., there are 100 service providers having zero clients and almost 100 service providers having only one client) and, on the other hand, a long tail of service providers experiencing a very high load. This unfairness of load distribution can be understood by examining the extremes, i.e., the most loaded service provider has 63 clients whereas at the same time, there are 100 service providers that do not have any clients at all. This is an undesirable performance of the traditional ReDiR.

Figure 3:
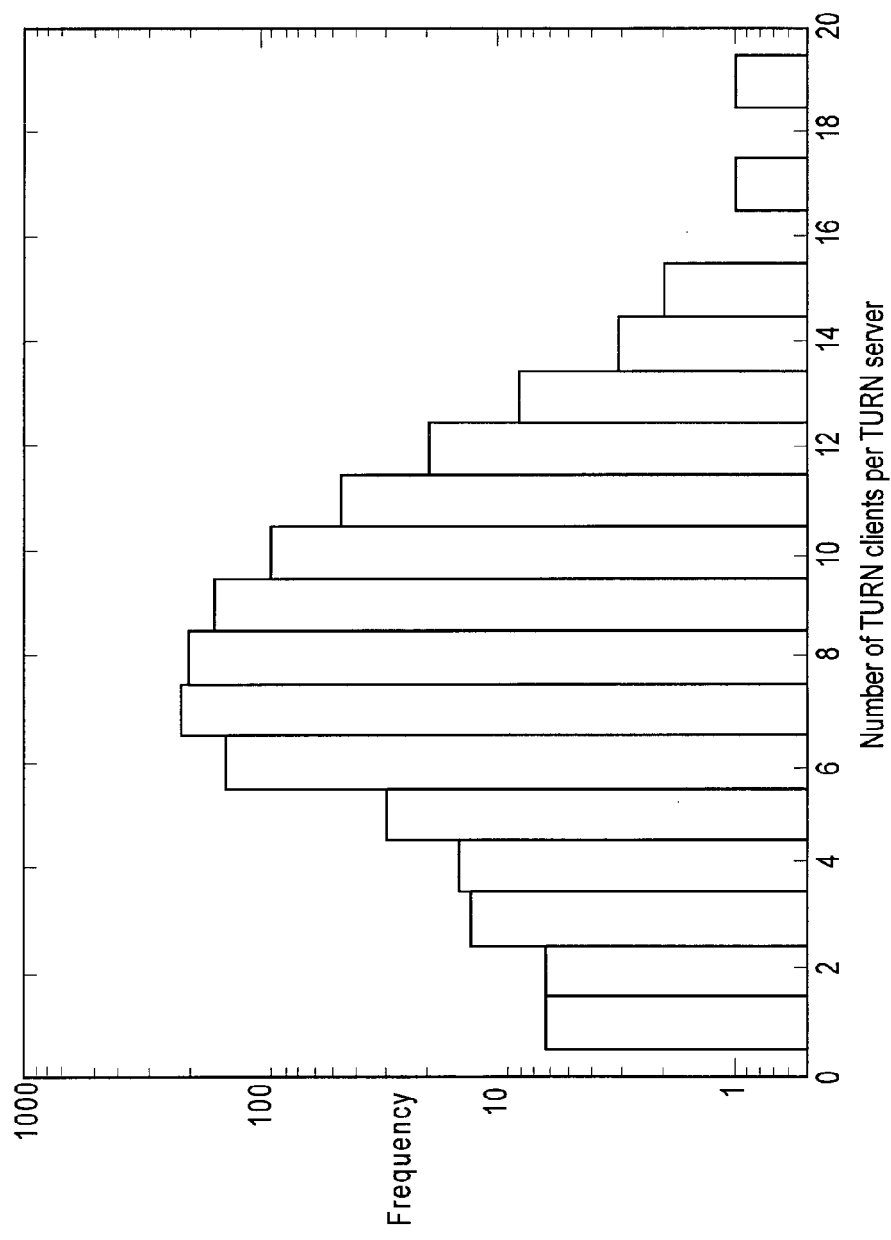
FIG. 3 illustrates a distribution of service clients per service provider according to an exemplary embodiment.

For an ideal discovery mechanism in a system having 9000 service clients and 1000 service providers, each service provider would have about 9 service clients. Of course, this ideal discovery mechanism is difficult to achieve in a real-world system with constantly changing service clients and service providers population. However, in a well balanced system, such a distribution should be Gaussian (i.e., the histogram should be bell-shaped). In that case, there would be a high number of service providers having a fair load, i.e., 9 clients per service provider. A discovery mechanism modified based on the exemplary embodiments to be discussed next exhibits the distribution shown in FIG. 3. It can be seen from this figure that the resulting load distribution is close to the Gaussian distribution (i.e., the histogram is close to the bell shape). Thus, there is a considerable improvement compared to the basic, unmodified ReDiR (its distribution is shown in FIG. 2)

Figure 4:
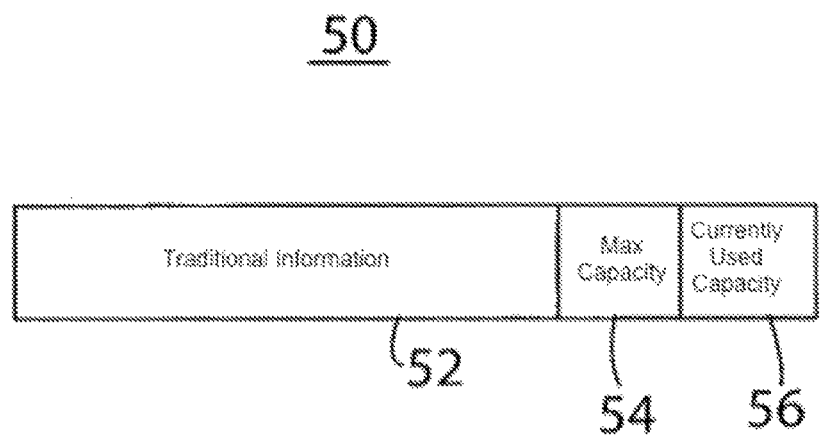
FIG. 4 illustrates a modified record for a discovery mechanism according to an exemplary embodiment.

According to an exemplary embodiment, the ReDiR service provider records are extended by adding two new parameters: the maximum capacity $C_{max}$ of the service provider and the currently used capacity $C_{current}$ of the service provider. In one application, the maximum capacity $C_{max}$ can be the number of service clients that the service provider can support concurrently. The currently used capacity $C_{current}$ can be, for example, the number of service clients that the service provider is currently serving (i.e., the current load of the service provider). The currently used capacity may be measured by the service provider and updated on the tree as necessary. Thus, as shown in FIG. 4, an existing record 50 in ReDiR includes the traditional information 52, and the new parameters 54 and 56, the maximum capacity and the currently used capacity, respectively.

The introduction of the above noted parameters may be correlated with behavior changes for the service clients and/or service providers. The changes in the service providers' behavior are discussed next. According to an exemplary embodiment, the currently used capacity $C_{current}$ changes over time. Thus, the service provider needs to update the value of $C_{current}$ in its records in the ReDiR tree to keep the information up to date. This novel update procedure may be independent of the regular ReDiR refresh procedure (which is performed for preventing ReDiR records from expiring). The novel update procedure may need to be performed more frequently than the regular ReDiR refresh procedure.

However, updating $C_{current}$ every time the service provider acquires a new client or loses an existing client can be expensive in terms of the generated traffic. Therefore, the service providers may be configured to update $C_{current}$ only after the number of service clients served has changed by a predetermined value Z, where Z can be a number that depends, for example, on the size of the overlay network. For example, if $C_{current}$ is initially 0, and Z=5, the service provider will not update $C_{current}$ in the ReDiR tree until $C_{current}$ reaches the value 5. Other values may be used for Z. However, whenever a periodic ReDiR refresh is performed as part of the regular ReDiR procedures, the service provider can use this opportunity to update $C_{current}$ at no additional cost by including the current value in the request sent to refresh the record.

Figure 5:
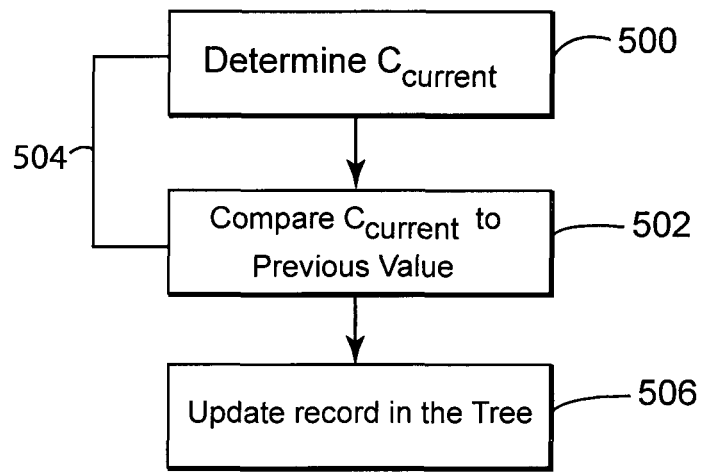
FIG. 5 is a flowchart illustrating a method for updating a record in a tree according to an exemplary embodiment.

This procedure is illustrated in FIG. 5. In step 500, a value of the $C_{current}$ is determined. After a predetermined time interval, the value of $C_{current}$ is again determined. In step 502, the most recent value of $C_{current}$ is compared with a previous value. A difference between the two values may be calculated. If the difference is smaller than Z, the process returns to step 500 (in step 504) and does not update its record. However, if the difference is equal or larger than Z, the process advances to step 506 in which the service provider updates its record. As already discussed, this procedure is independent of the ReDiR refresh procedure that updates the record in the tree.

If $C_{max}$ is reached, the service provider is configured to not accept more service clients. According to an exemplary embodiment, the service provider may be configured to remove its record from the ReDiR tree when the maximum capacity is reached. In one application, if $C_{max}$–a is reached, where a is a predetermined number, the service provider may remove its record from the ReDiR tree. This procedure ensures that no further service client is able to contact the service provider, thus preventing an overload of the service provider.

Figure 6:
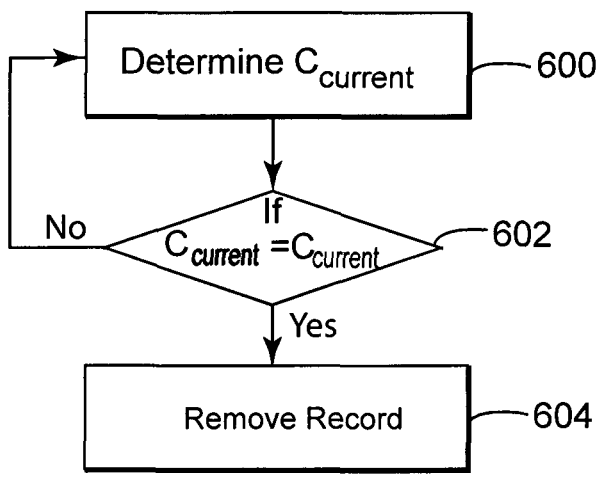
FIG. 6 is a flowchart illustrating a method for removing a record from a tree according to an exemplary embodiment.

The above procedure is schematically illustrated in FIG. 6. In step 600, the $C_{current}$ is determined. In step 602, the $C_{current}$ is compared to the maximum capacity. If the two parameters are not equal, the process returns to step 600. If the two parameters are equal, the process advances to step 604 in which the record of the service provider is removed from the tree.

The service provider may be configured to add its record back to the ReDiR tree when its current load drops below $C_{max}$ or $C_{max}$–a by a value between 1 and Z (the exact drop in load after which the record is inserted back to the tree is a local decision by the service provider). According to another exemplary embodiment, the service provider may be configured to reject a service client if it happens that, for some reason, the service provider has already reached the maximum capacity and it is selected by the service client.

Figure 7:
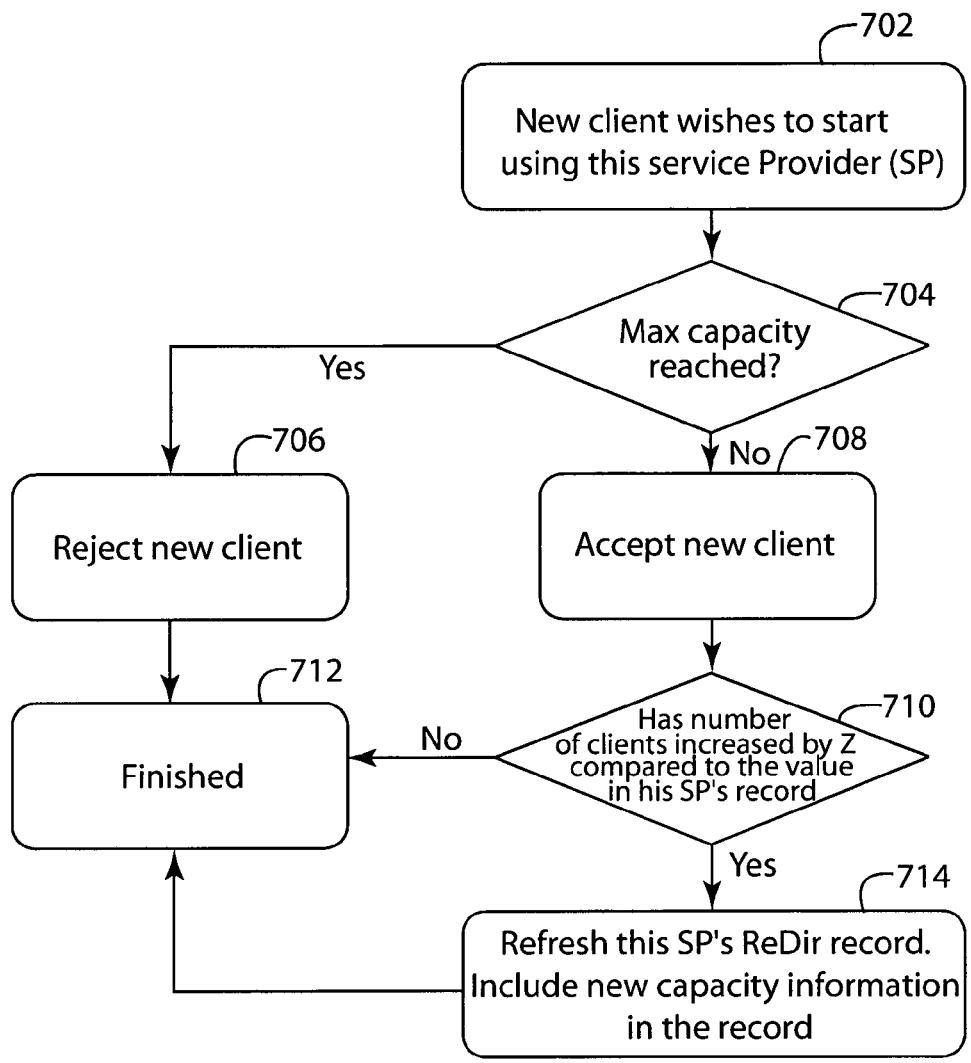
FIG. 7 is a flowchart illustrating a method for accepting and rejecting new clients according to an exemplary embodiment.

A procedure for accepting or rejecting a new service client is illustrated in FIG. 7. In step 700 a new service client desires to use a given service provider. The service provider checks in step 702 whether the maximum capacity has been reached. If the answer is yes, the service provider rejects the new client in step 706. However, if the maximum capacity has not been reached, the service provider accepts the new client in step 708. In step 710, the service provider determines whether the number of new clients has increased by Z. If the answer is no, the process finishes in step 712. If the answer is yes, the service provider refreshes in step 714 its ReDiR record and then the process stops with step 712.

Behavior changes of the service clients are now discussed with reference to FIG. 8. For the regular (i.e., unmodified) ReDiR mechanism, a service client having an identifier X is only allowed to use a single service provider. More specifically, the service client having identifier X is permitted to connect to the service provider Y whose identifier is the closest successor of X in the ReDiR tree. It was observed by the present inventors that a problem with this rule of the ReDiR mechanism is that it results in an uneven distribution of the load. Therefore, according to an exemplary embodiment, the ReDiR service discovery operation is extended as discussed next.

During a service discovery operation in the traditional ReDiR mechanism, a service client fetches a number of tree nodes from the ReDiR tree, i.e., performs plural look-ups for finding the appropriate service provider. During each look-up procedure, the service client fetches the above noted tree nodes and their information. After finding the correct service provider, the fetched tree nodes and associated information is discarded. According to this exemplary embodiment, instead of discarding the tree nodes and service providers records contained in the tree nodes in cases when the closest successor of the service client is not found at a given level in the tree, the service client stores the data related to service providers whose records it encounters during the discovery operation in a temporary cache. The temporary cache may be provided locally, at the service client.

Figure 8:
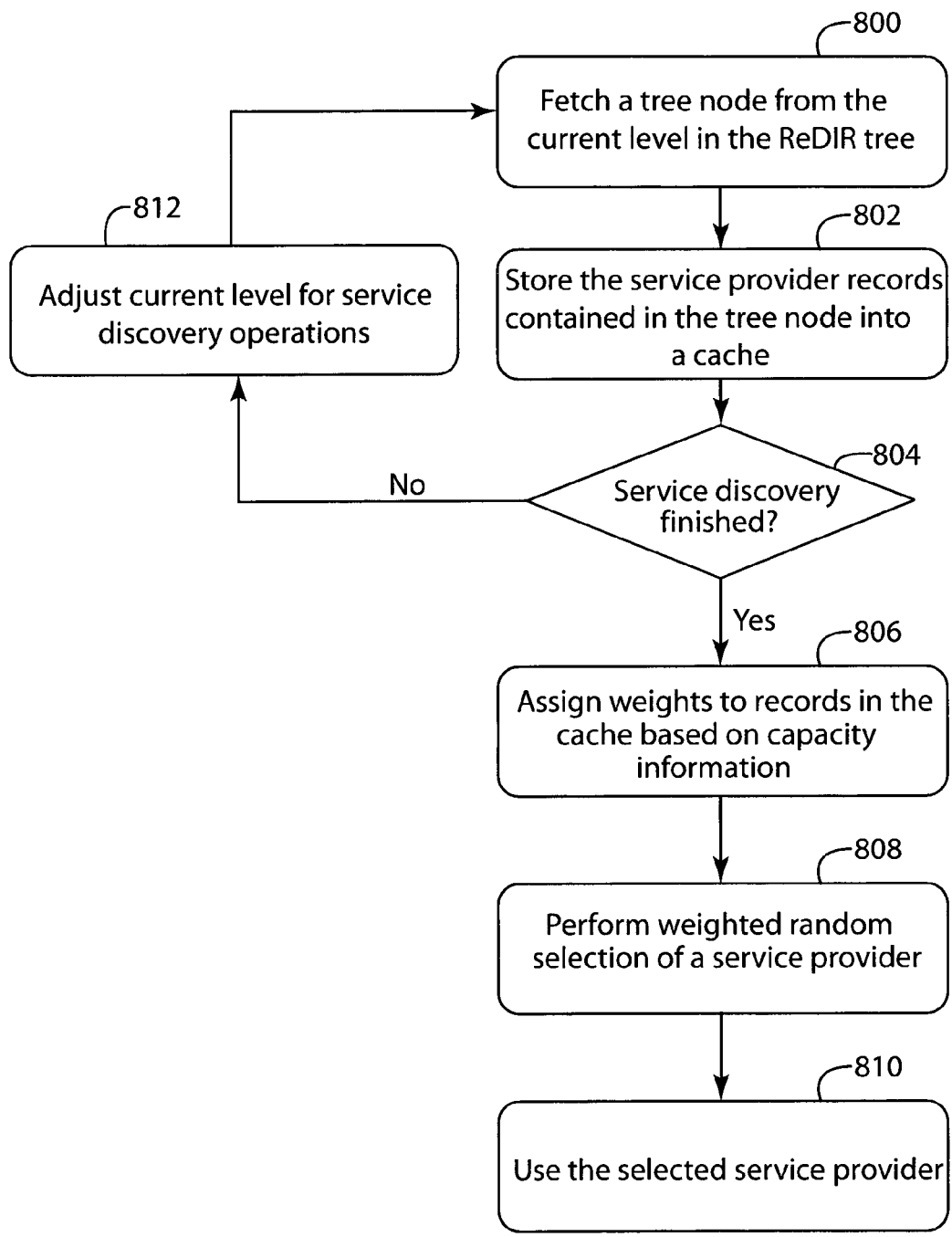
FIG. 8 is a flowchart illustrating a method for selecting a service provider according to an exemplary embodiment.

Thus, as shown in FIG. 8, in step 800 the service client fetches a tree node from the current level in the ReDiR tree. That information is stored in step 802 to a cache. In step 804 a determination is made whether the service discovery is finished. If not, the process advances to step 812 to adjust a current level for service discovery operations. Afterwards, the process restarts as step 800. If the service discovery operation is finished in step 804, the service client is configured in step 806 to assign a weight $W_i$ to each service provider i stored in the cache as follows:

$$W_i = \frac{C_{max_i} - C_{current_i}}{\sum_{j=1}^{N} (C_{max_j} - C_{current_j})},$$

where N is the number of service providers stored in the cache.

Having calculated all the weights $W_i$, the service client is configured to use in step 808 these weights to select a random service provider in such a way that the service provider with the largest weight $W_i$ has the highest probability of being selected and the service provider with the lowest weight $W_i$ has the lowest probability of being selected. Other approaches may be envisioned for selecting the service provider based on the calculated weights. Then, in step 810 the service client uses the selected service provider. Thus, according to this embodiment, the selection of the service provider is not performed as prescribed by the traditional ReDiR mechanism.

Figure 9:
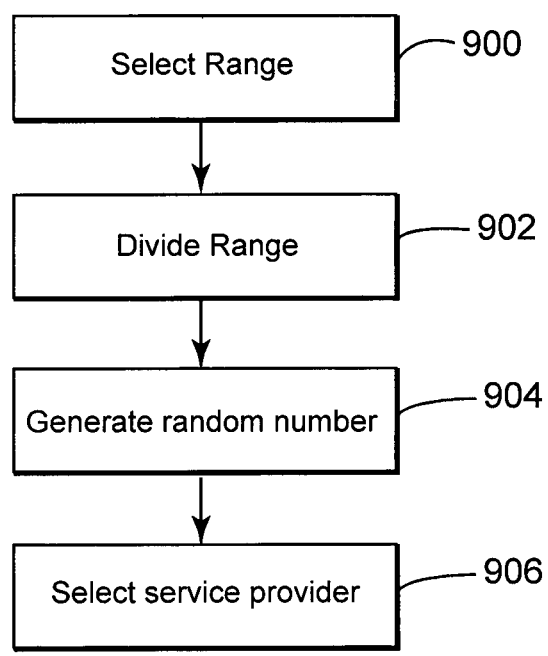
FIG. 9 is a flowchart illustrating another method for selecting a service provider according to an exemplary embodiment.

According to an exemplary embodiment, the random selection of the service provider is achieved as discussed next with reference to FIG. 9. For example, a range (0,1) is selected in step 900. This range is divided in step 902 into subintervals whose sizes correspond to the values of the weights (the sum of the weights is 1.0 when using the equation above). In step 904 a random number between 0 and 1 is generated. In step 906, a service provider is selected having the weight within that subinterval that includes the random number.

An example intended to clarify and not to limit the above procedure is discussed next. Suppose that there are two service providers $SP_1$ and $SP_2$, whose weights are $W_1=0.25$ and $W_2=0.75$, respectively. The interval (0,1) is divided into two subintervals: [0, 0.25) corresponding to W and [0,25, 1.0) corresponding $W_2$. If the generated random number is, for example, 0.8, then that number falls within the subinterval corresponding to $W_2$ and thus $SP_2$ is selected.

The result of using the procedure described above is that lightly loaded service providers are favored over heavily loaded ones. This results in an even distribution of the load between the service providers.

Various improvements of the above discussed methods and processes are now discussed. According to an exemplary embodiment, the service clients may perform M parallel service discovery operations and/or the service providers may perform M parallel service registrations, wherein M is a predetermined number. These parallel operations further improve the load distribution as discussed next.

An embodiment in which a service client performs M service discovery operations is discussed now. The service client performing M parallel service discovery operations may be configured to do one service discovery operation for its own identifier and, in addition, M−1 service discovery operations for randomly generated identifiers. All the service providers records learned as a result of these operations are stored in the temporary cache described above. Thus, the amount of information for this exemplary embodiment is richer than the amount of information for a single service discovery operation. Once all the discovery operations have finished, the weighting mechanism described above is applied to all records in the cache, including the ones returned by the additional service discovery operations. Thus, such an embodiment increases the number of service providers to be weighted.

According to another exemplary embodiment, a service provider may be configured to perform M parallel registration operations. In performing M parallel registration operations, the service provider is configured to perform one registration for its own identifier and, in addition, M−1 registrations for randomly generated identifiers. All the registrations are refreshed periodically in the usual way. By having multiple registrations in the ReDiR tree of the same service provider, improves the load distribution of the entire mechanism as a service provider is more likely to be found in the tree.

According to another exemplary embodiment, the capacity concept discussed above can be extended to other type of information. Until now, the capacity concept referred to the number of service clients per service provider. However, the mechanism described above may be applied to other types of capacity information. For example, a node providing a TURN relay service might publish in its ReDiR record the maximum uplink bandwidth ($C_{max}$) it has available and also the currently used uplink bandwidth ($C_{current}$). The service clients can then use this information to select a lightly loaded service provider (i.e., a TURN server having plenty of uplink bandwidth left). In one application, it is possible to include multiple service-specific capacity parameters in the ReDiR records. As an example, the ReDiR record of a peer providing a TURN relay service may include capacity parameters such as the number of concurrent clients, available bandwidth, type of access network, CPU capacity, type of the device, etc. Various algorithms for combining together these parameters may be used.

According to another exemplary embodiment, a service provider SP having spare capacity may, for example, monitor the service lookup requests routed through it. This is possible since in a P2P overlay network, service providers participate as regular peers in the overlay. If the service provider SP detects that the service lookup has been sent as part of a discovery operation whose purpose is to discover a service of the same type that the service provider SP is providing, the service provider SP may, if it has the capacity to serve additional clients, intercept the request (i.e., terminate the request and answer it locally). The service provider SP could be configured to, in addition, set the value of $C_{current}$ to zero and the value of $C_{max}$ to infinity (i.e., the maximum value) to cause the service client that sent the service lookup request to use SP as the service provider. This exemplary embodiment may work best in an overlay network where the density of the service providers is high enough compared to the total size of the network.

One or more advantages of the exemplary embodiments discussed above are now discussed. For example, the mechanism discussed above may be applied not only to the ReDiR but also to a TURN server registration and discovery in a P2P (e.g., P2PSIP) overlay network, discovery and registration of voice mail service from a P2P telephony network, registration and discovery of gateway nodes in a P2P overlay network, etc. The exemplary embodiments are applicable to both the discovery and the registration operations of any given service.

One or more of the above discussed exemplary embodiments addresses previously undiscovered shortcomings in ReDiR. These embodiments help to improve the load balance of service providers in a P2P overlay network utilizing ReDiR. One or more of the exemplary embodiments makes it possible to take into account the heterogeneity of service providers. This feature is not supported by the regular, unmodified ReDiR.

The inventive mechanisms discussed above may be applied to any DHT-based overlay network that uses ReDiR. They are not specific to a single DHT. They are also not P2PSIP-specific and not specific to the TURN server discovery. P2PSIP and TURN server discovery are used only as examples.

Figure 10:
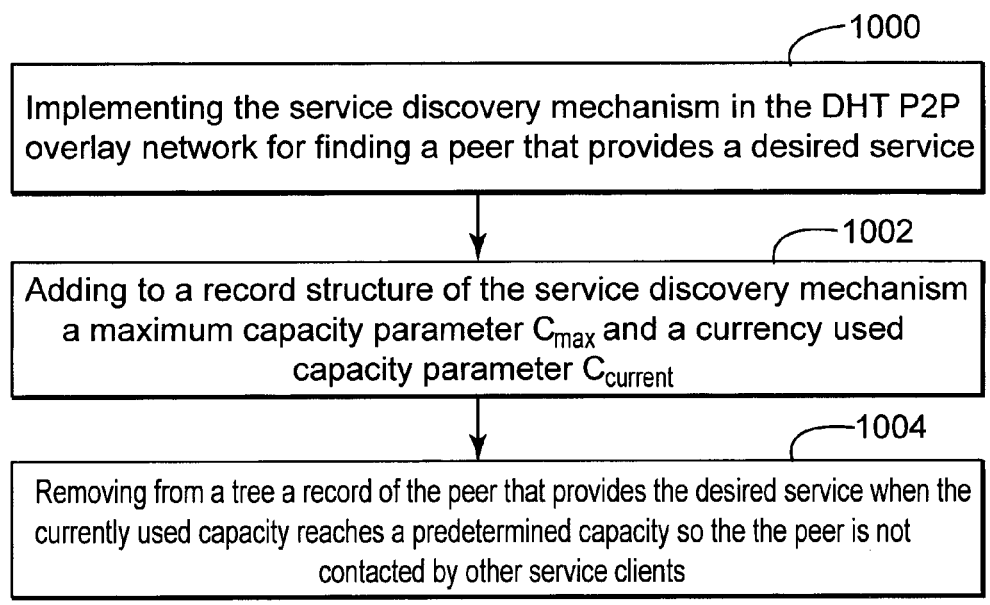
FIG. 10 is a flowchart illustrating a method for balancing a load in a service discovery mechanism according to an exemplary embodiment.

An example of an application for load balancing a service discovery mechanism in a Distributed Hash Table, DHT, based Peer-to-Peer, P2P, overlay network is discussed now with regard to FIG. 10. The application may be implemented in hardware, software, or a combination thereof. The application includes a step 1000 of implementing the service discovery mechanism in the DHT P2P overlay network for finding a peer that provides a desired service, wherein the service discovery uses a tree for the desired service; a step 1002 of adding to a record structure of the service discovery mechanism a maximum capacity parameter $C_{max}$ and a currently used capacity parameter $C_{current}$, wherein the maximum capacity and the currently used capacity parameters are associated with the peer that provides the desired service; and a step 1004 of removing from the tree a record of the peer that provides the desired service when the currently used capacity reaches a predetermined capacity so that the peer is not contacted by other service clients.

Figure 11:
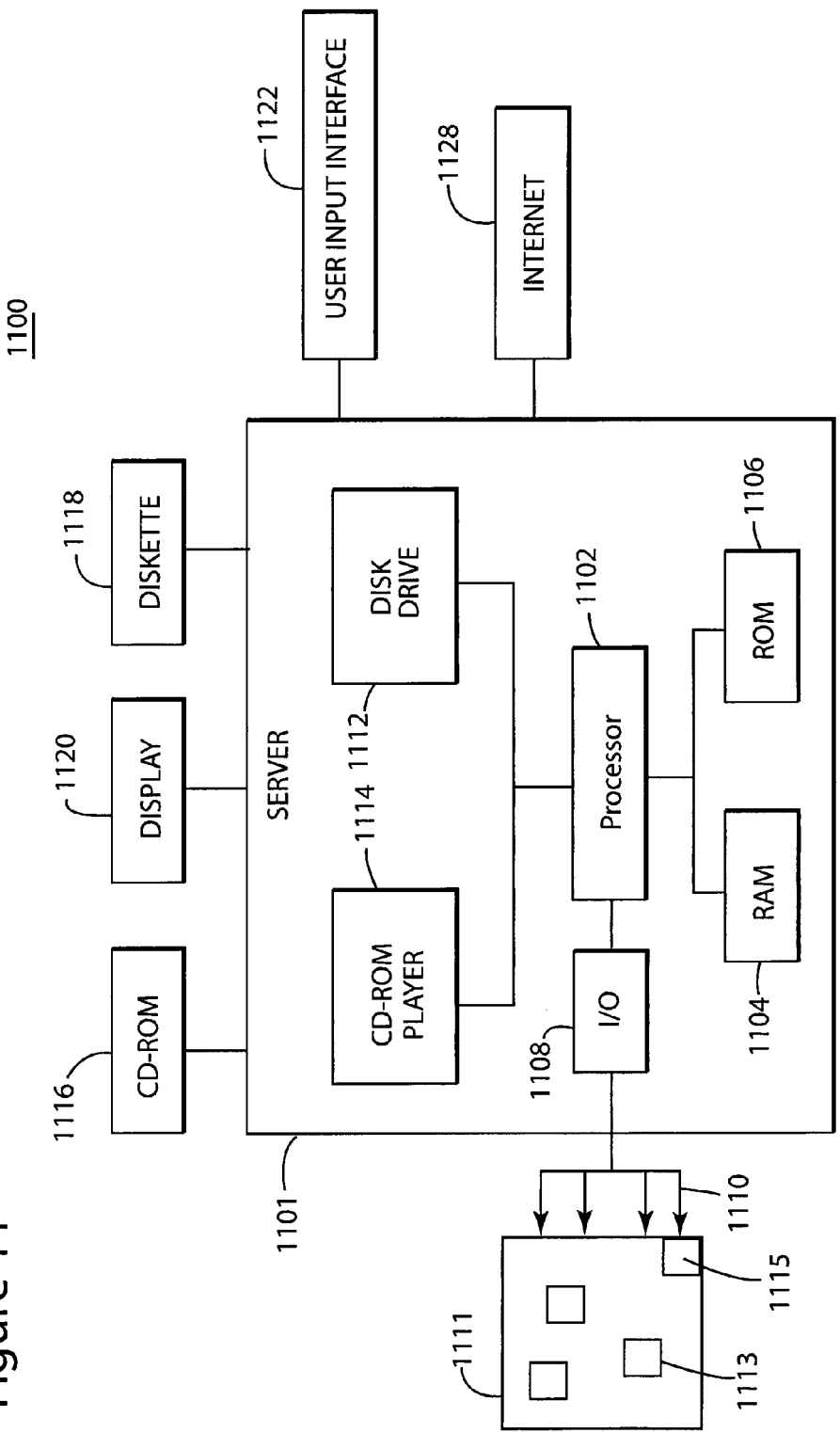
FIG. 11 is a schematic diagram of a peer that implements a load balanced service discovery according to an exemplary embodiment.

An example of a representative peer (node) of a network capable of carrying out operations in accordance with the exemplary embodiments is illustrated in FIG. 11. At the same time, the structure shown in FIG. 11 may describe the structure of nodes of the overlay network. Hardware, firmware, software or a combination thereof may be used to perform the various steps and operations described herein. The node 1100 of FIG. 11 is an exemplary computing structure that may be used in connection with such a system.

The exemplary node 1100 suitable for performing the activities described in the exemplary embodiments may include a server 1101. Such a server 1101 may include a central processor (CPU) 1102 coupled to a random access memory (RAM) 1104 and to a read-only memory (ROM) 1106. In one application, the node 1100 may not include the server 1101 but only its components, e.g., processor and memory. In another application, the server 1101 may be part of the overlay network 1111. The ROM 1106 may also be other types of storage media to store programs, such as programmable ROM (PROM), erasable PROM (EPROM), etc. The processor 1102 may communicate with other internal and external components through input/output (I/O) circuitry 1108 and interface 1110, to provide control signals and the like.

Interface 1110 may be connected to the DHT P2P overlay network 1111 and network 1111 may include the plural peers 1113. Each peer 1113 may act as a service client or a service provider or both as discussed in the previous embodiments.

The service discovery mechanism may be stored in one or more peers 1113 or in a dedicated device 1115 of the overlay networks or both. The processor 1102 carries out a variety of functions as is known in the art, as dictated by software and/or firmware instructions. The method discussed above may be implemented as computer instructions in any of the storage device of the node and the processor may be configured to perform the steps of these methods.

The server 1101 may also include one or more data storage devices, including hard and floppy disk drives 1112, CD-ROM drives 1114, and other hardware capable of reading and/or storing information such as DVD, etc. In one embodiment, software for carrying out the above discussed steps may be stored and distributed on a CD-ROM 1116, diskette 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LCD displays, plasma display, cathode ray tubes (CRT), printer, etc. A user input interface 1122 is provided, including one or more user interface mechanisms such as a mouse, keyboard, microphone, touch pad, touch screen, voice-recognition system, etc.

The server 1101 may be coupled to other computing devices, such as landline and/or wireless terminals via a network. The server may be part of a larger network configuration as in a global area network (GAN) such as the Internet 1128, which allows ultimate connection to the various landline and/or mobile client/watcher devices.

The disclosed exemplary embodiments provide an application network and peer for using a load balanced discovery system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for load balancing a service discovery mechanism in a Distributed Hash Table (DHT) based Peer-to-Peer (P2P) overlay network, the overlay network including plural peers among which peers that provide services are service providers and peers that use the services are service clients, the method comprising:

implementing the service discovery mechanism in the DHT P2P overlay network for finding a service provider that provides a desired service, wherein the service discovery mechanism uses a tree for the desired service with record structures corresponding to the service providers for the desired service;

adding a maximum capacity parameter $C_{max}$ and a currently used capacity parameter $C_{current}$ to a record structure in the tree, wherein the maximum capacity and the currently used capacity parameters are associated with a respective one of the service providers for the desired service; and removing, from the tree, a record structure of a service provider contacted by service clients when the currently used capacity of the service provider reaches a predetermined capacity so that the service provider is not contacted by other service clients.

2. The method of claim 1, wherein the service discovery mechanism is a standardized protocol Recursive Distributed Rendezvous, ReDiR.

3. The method of claim 1, further comprising:
performing a service discovery operation for finding the service provider for the desired service; and
storing tree nodes and record structures of service providers associated with the tree nodes used during the service discovery operation that are not a closest successor.

4. The method of claim 3, further comprising:
modifying the service discovery mechanism to allow a service client performing the service discovery operation to use not only the closest successor as the service provider but other service providers.

5. The method of claim 3, further comprising:
assigning weights to each service provider associated with the stored tree nodes; and
selecting a random service provider based on the assigned weights.

6. The method of claim 5, wherein a weight $W_i$ for a service provider i is calculated based on:

$$W_i = \frac{C_{max_i} - C_{current_i}}{\sum_{j=1}^{N} (C_{max_j} - C_{current_j})},$$

where $C_{max_i}$ is the maximum capacity of the service provider i, $C_{current_i}$ is the currently used capacity of the service provider i, and N is the number of service providers in the tree.

7. The method of claim 1, further comprising:
performing M service discovery operations by a single service client, wherein one service discovery operation is performed for an identifier of the single service client and the remaining M−1 service discovery operations are performed by the single service client using randomly generated identifiers.

8. The method of claim 7, wherein information related to all service providers identified by the single service client is stored, each service provider is associated with a weight and a service provider to be used is randomly selected based on the associated weights.

9. A service discovery mechanism apparatus in a Distributed Hash Table (DHT) based Peer-to-Peer (P2P) overlay network, the overlay network including plural peers, wherein the plural peers that provide the services are service providers, and the plural peers that use the services are service clients, the apparatus comprising:

a server configured to run a service discovery mechanism in the DHT P2P overlay network for finding a service provider that provides a desired service, wherein the service discovery mechanism uses a tree with record structures corresponding to service providers for the desired service;

a record structure of a service provider in the tree including a maximum capacity parameter $C_{max}$ and a currently used capacity parameter $C_{current}$, wherein the maximum capacity and the currently used capacity parameters are associated with a respective one of the service providers for the desired service; and the service discovery mechanism is configured to remove the record structure of a service provider contacted by service clients from the tree when the currently used capacity of the service provider reaches a predetermined capacity so that the service provider is not contacted by other service clients.

10. The service discovery mechanism apparatus of claim 9, wherein the service discovery mechanism is a standardized protocol Recursive Distributed Rendezvous, ReDiR.

11. A peer that uses a service discovery mechanism or a service registration mechanism in a Distributed Hash Table (DHT) based Peer-to-Peer (P2P) overlay network, the overlay network including plural peers, the peer comprising:

an interface configured to communicate with the overlay network to use (A) the service discovery mechanism in the DHT P2P overlay network for finding another peer that provides a desired service using a tree with record structures of peers that provide the desired service in the DHT P2P overlay network or (B) the service registration mechanism for registering in the tree for providing the desired service in the DHT P2P overlay network; and a processor configured to update a record structure in the tree used by the service discovery mechanism or the service registration mechanism, the record structure including a maximum capacity parameter $C_{max}$ and a currently used capacity parameter $C_{current}$, wherein the maximum capacity and the currently used capacity parameters are associated with a respective one of the peers for the desired service.

12. The peer of claim 11, wherein the service discovery mechanism is a standardized protocol Recursive Distributed Rendezvous, ReDiR.

13. The peer of claim 11, wherein the processor is further configured to:
perform a service discovery operation for finding the another peer providing the desired service; and
store tree nodes and service providers record structures associated with the tree nodes used during the service discovery operation that are not a closest successor.

14. The peer of claim 13, wherein the processor is further configured to:

assign weights to each service provider associated with the stored tree nodes; and select a random service provider based on the assigned weights.

15. The peer of claim 14, wherein a weight $W_i$ for a service provider i is calculated based on:

$$W_i = \frac{C_{max_i} - C_{current_i}}{\sum_{j=1}^{N} \left(C_{max_j} - C_{current_j}\right)},$$

where $C_{max_i}$ is the maximum capacity of the service provider i, $C_{current_i}$ is the currently used capacity of the service provider i, and N is the number of service providers in the tree.

16. The peer of claim 11, further comprising:

performing M service discovery operations, wherein one service discovery operation is performed for an identifier of the peer and the remaining M–1 service discovery operations are performed using randomly generated identifiers.

17. The peer of claim 16, wherein information related to all service providers identified by the peer is stored, each service provider is associated with a weight and a service provider to be used is randomly selected based on the weights.

* * * * *